United States Patent [19]

Beard

[11] Patent Number: 5,171,648
[45] Date of Patent: Dec. 15, 1992

[54] SNAP-ACTION CURRENT INTERRUPTION DIAPHRAGM SYSTEM FOR OVER-PRESSURIZED ELECTROCHEMICAL CELLS

[75] Inventor: Kirby W. Beard, Perkasie, Pa.

[73] Assignee: Alliant Techsystems Inc., Edina, Minn.

[21] Appl. No.: 744,530

[22] Filed: Aug. 13, 1991

[51] Int. Cl.$^5$ .................. H01M 2/00; H01M 10/48
[52] U.S. Cl. ......................... 429/61; 429/90; 429/194
[58] Field of Search .............. 429/61, 194, 62, 90

[56] References Cited

U.S. PATENT DOCUMENTS

| | | |
|---|---|---|
| 3,373,057 | 3/1968 | Jost et al. |
| 3,617,386 | 11/1971 | Bosben .................. 136/107 |
| 4,025,696 | 5/1977 | Tucholski et al. ........ 429/58 X |
| 4,028,478 | 6/1977 | Tucholski .............. 429/61 |
| 4,035,552 | 7/1977 | Epstein ................. 429/58 |
| 4,191,870 | 3/1980 | Yanagisawa et al. ..... 200/83 P |
| 4,275,739 | 6/1981 | Fischell ............. 128/419 PS |
| 4,287,780 | 9/1981 | Poling ................. 74/100 P |
| 4,573,398 | 3/1986 | Johnson et al. ......... 92/101 |
| 4,690,879 | 9/1987 | Huhndorff et al. ........ 429/61 |
| 4,756,983 | 7/1988 | Tucholski .............. 429/61 |
| 4,818,641 | 4/1989 | Ledenican ............. 429/61 |
| 4,853,304 | 8/1989 | Ebner et al. ........... 429/192 |
| 4,855,195 | 8/1989 | Georgopoulos et al. .... 429/54 |
| 4,871,553 | 10/1989 | Huhndorff ............. 429/61 |
| 4,992,344 | 2/1991 | Coppers ............... 429/61 |
| 5,057,382 | 10/1991 | Tucholski ............. 429/61 |

Primary Examiner—John S. Maples
Attorney, Agent, or Firm—Haugen and Nikolai

[57] ABSTRACT

An active metal non-aqueous electrochemical cell including a lithium anode, an organic electrolyte system, a cathode contained in a cell housing, and at least one hermetically sealed pin-type lead extending through a cell header is provided with an hermetically sealed, pressure and/or temperature actuated, snap-action header diaphragm disconnect mechanism fixed to, and which snaps outward to disconnect, the pin terminal from the internal cell lead in response to elevated internal pressure reaching a sufficient amount to operate the snap-action mechanism. The position of the snap-action header diaphragm is visible outside of the cell.

13 Claims, 3 Drawing Sheets

SNAP-ACTION CURRENT INTERRUPTION DIAPHRAGM SYSTEM FOR OVER-PRESSURIZED ELECTROCHEMICAL CELLS

BACKGROUND OF THE INVENTION

1. Field of the Invention

The present invention is directed generally to non-aqueous electrochemical cells and, more particularly, to improvements with respect to over-pressure problems occurring during charging of secondary or rechargeable type cells and during high rate discharge in primary or secondary cells.

2. Description of the Related Art

Non-aqueous active metal cells have been utilized to achieve much higher energy densities or energy-to-weight ratios in both primary and secondary (rechargeable) applications. Potential uses and desirability of cells having such high energy density has created a great deal of interest in using the technology in many areas including those where safety is of prime concern. One traditional drawback long associated with and still plaguing lithium or other high energy cells has been concern with safety surrounding the discharge of and, in the case of secondary cells, the recharging of such cells because of their history of runaway reaction and over-pressurization problems.

Cells of the class typically consist of a light, strongly reducing metallic anode, normally lithium or an alloy of lithium, an electrolyte system including an aprotic, non-aqueous solvent depolarizer into which has been dissolved an appropriate quantity of a salt of the anode metal to form a conductive solution, and an oxidizing agent as the cathode active material. In some cases, the electrolyte solvent or co-solvent also acts as the active cathode material which is subsequently reduced at a porous carbon electrode.

Primary lithium cells (both active and reserve) have been in use for quite some time; however, rechargeable lithium cells have been made practical only relatively recently with improvements in lithium cycling efficiency. The electrolyte systems in secondary lithium cells have been predominantly ether- or ester-based organic electrolyte solutions. The ether-based solutions include, for example, the electrolyte salt $LiAsF_6$ dissolved in 2-methyl tetrahydrofuran (2-methyl THF). Ester-based solutions generally have higher conductivities and so appear to be more promising overall. Typical esters include methyl formate ($HCOOCH_3$) and methyl acetate ($CH_3COOCH_3$). The electrolyte salt normally combined with methyl formate or methyl acetate is $LiAsF_6$ which may contain an amount of $LiBF_4$. The cathode material is normally a transition metal oxide such as $V_2O_5$, or the like.

The typical active metal cell of the class of interest is hermetically sealed, and many primary and almost all rechargeable cells using organic solvent electrolytes incorporate a venting system designed to prevent case rupture of the cell or battery should abnormally high internal pressure occur. The abnormally high pressure may result from abuse of the cell such as from overheating, external shorting, causing a very high discharge rate, overcharging and other intentional or unintentional practices. The over-pressure condition may also be caused by internal failure such as shorts due to dendrite formation, for example. Present venting systems are of the external pressure relief type and function quite well to prevent explosions or cell ruptures in extreme circumstances. Operation of the vent mechanisms, however, results in the release of hot, possibly flammable or toxic gases, or the like, which is also undesirable. Cell over-pressure, which occurs typically as part of an end-of-life failure mode in rechargeable lithium cells, involves dendritic shorts (which eventually form on charging even at low currents) causing degradation of the electrolyte. Pressurization and eventual venting occurs often without any indication that a problem exists as it is usually not otherwise predicted.

Several schemes have been devised which provide mechanical devices for opening cell circuits based on pressure and/or heat. One such spring-loaded or automatic reset system is illustrated and described in Jost, et al. U.S. Pat. No. 3,373,057. There, a spring-biased, snap-acting mechanism within the cell housing operates to open the charging circuit during an over-pressure condition. The contact is designed to reclose once the pressure is reduced so that the biasing spring is able to restore the original configuration and circuit continuity. Other systems are shown in Yanagisawa U.S. Pat. No. 4,191,870 and Johnson, et al. U.S. Pat. No. 4,573,398. In addition, nonresettable or one-time operating mechanisms are known such as that shown in Tucholski U.S. Pat. No. 4,028,478, in which a bevelled spring washer operates to break a connection upon expansion of the cell container.

Whereas, there are known prior devices which operate to separate cell circuitry in response to over-pressure conditions which do not require external venting of the cells, there yet remains the need for a simplified positive system which both visibly displays the status of the circuitry and provides a positive disconnect within the cell.

SUMMARY OF THE INVENTION

By means of the present invention, problems associated with overpressurization of active metal cells, particularly secondary active metal cells, which occur due to overloading or recharging and which can be relieved by disconnecting the cathode from the charging or discharging circuit are solved by the provision of an efficient snap-acting, circuit breaking mechanism which provides an externally visible indication as to whether the circuit is connected or disconnected in a simplified manner and which requires few parts. The system of the invention may be in the nature of a one-time permanent disconnect mechanism or of a resettable type capable of snapping back into its original configuration restoring circuit continuity.

The system of the invention in the resettable embodiment utilizes a snap-acting, circuit breaking mechanism which simply disconnects the protruding pin lead from the corresponding electrode system by removing the lead from an internal contact in a manner such that it can be returned to position or replaced when the pressure diminishes. The snap-action mechanism shifts a diaphragm between a dome-shaped structure protruding from the cell or battery when in the over-pressurized mode and a flat, or slightly concave, configuration when in the normal operating mode. The dome-like protruding appearance of the top of the cell indicates that the over-pressure condition has caused the snap-action diaphragm mechanism to snap away from the interior of the cell, thereby disconnecting the associated lead.

In the one-time or non-resettable embodiment, the snap-action mechanism operates in a manner identical to that of the resettable configuration. The lead itself, however, is configured with a break-away or pressure sensitive necked-down section which causes parts of the lead end to break away or sever from the electrode connection when the snap-action occurs, thereby permanently breaking the connection.

The snap-action system of the present invention provides a simplified and positive approach to dealing with the overpressurization problem which is quite low in cost. In addition, the operation of the snap-action mechanism of the present invention provides visible external evidence of the internal condition of the cell with respect to the over-pressure condition in a manner which permits additional action to be taken, if desired.

BRIEF DESCRIPTION OF THE DRAWINGS

In the drawings, wherein like numerals are used to designate like parts throughout the same.

DETAILED DESCRIPTION

Certain exemplary embodiments which capture the general nature of the invention will next be described in greater detail with specific reference to the drawings. The embodiments are deemed to be representative, but by no means exhaustive, of the contemplated forms to be taken by the snap-acting circuit breaking device of the invention.

Figure 1:
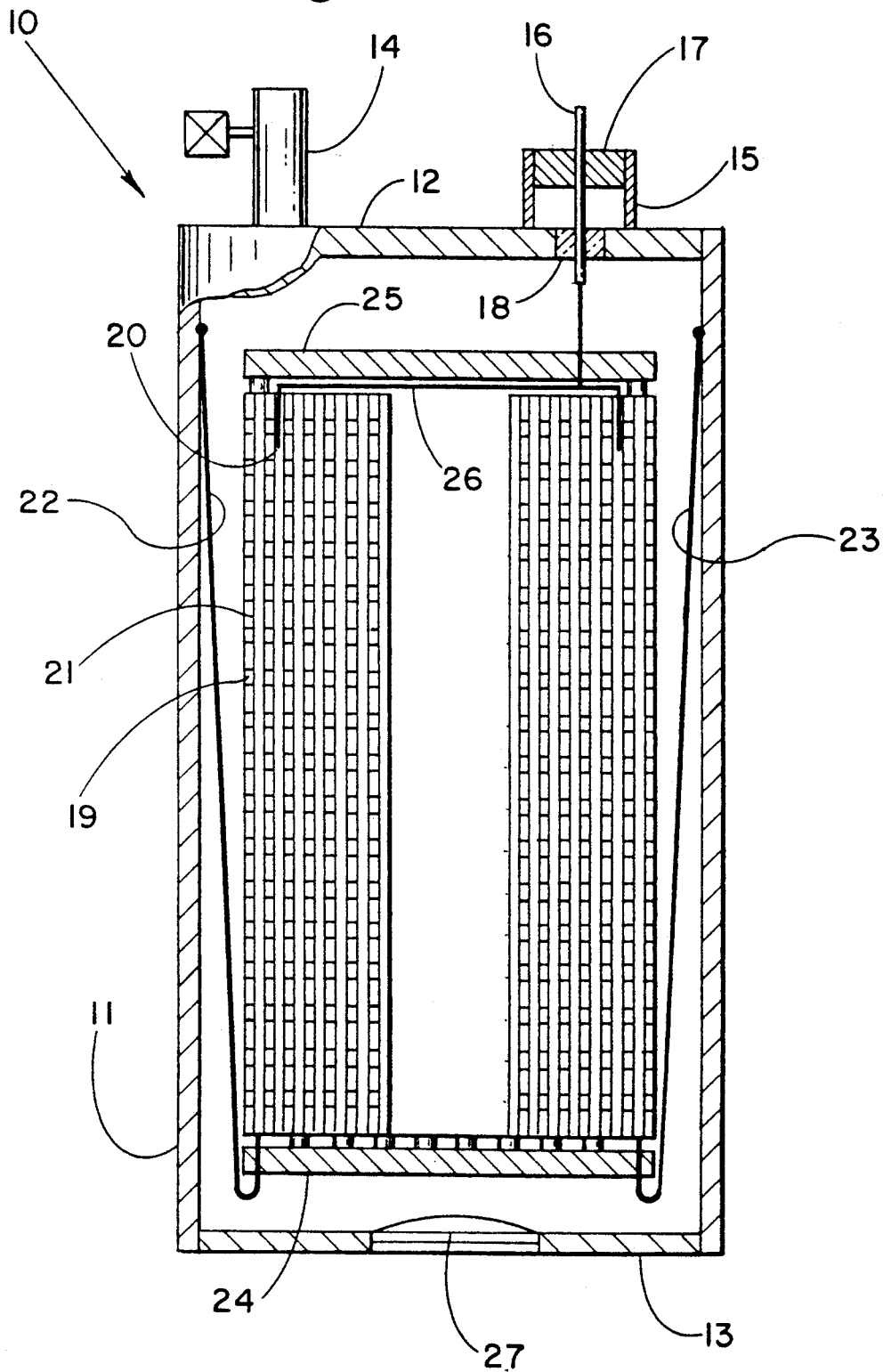
FIG. 1 is a view, partially in section, of a typical electrochemical cell of the prior art without the snap-action pressure relief system of the invention.

FIG. 1 depicts, partially in section, a typical prior art battery which may be a standard-sized "D" cell as shown generally at 10. The cell includes a casing having a side wall 11 to which are attached a welded top header 12 and bottom member 13 which may all be of stainless steel, or the like. The header is further provided with a resealable fill valve 14 through which electrolyte may be loaded into the cell after the bottom and header have been welded in place, and a general compression seal is shown at 15 through which the battery lead terminal pin 16 passes after passing through the header. The lead 16 is insulated from the compression seal at 17 and from the header at 18 by means of a glass frit or other mechanism which is designed to both electrically insulate and seal. It is designed to expand and contract in a manner close to that of the material sealed to preserve the integrity of the seal itself during use. The battery contains a plurality of concentric, generally cylindrical electrode configurations which include anodes as at 19, cathodes as at 20, with separators as at 21 therebetween. Whereas, the case can be either positive or negative, the particular example shows collective anode leads 22 and 23 being attached to the casing side wall. A bottom insulator 24, together with a top insulator 25, are also provided to insure separation of the cell components from each other and from the shell casing parts. The cathode lead 16 is also shown connected to a common header 26. The particular embodiment illustrated in FIG. 1 corresponds to what is known in the art as a bottom-venting battery in which a coin vent slot 27 is provided in the bottom of the battery which is in the form of an indentation containing a slot section of reduced metal thickness which is designed to fail prior to the other cell casing parts allowing the accumulated vapors to escape the cell prior to the development of any catastrophic cell or rupture condition.

Figure 2:
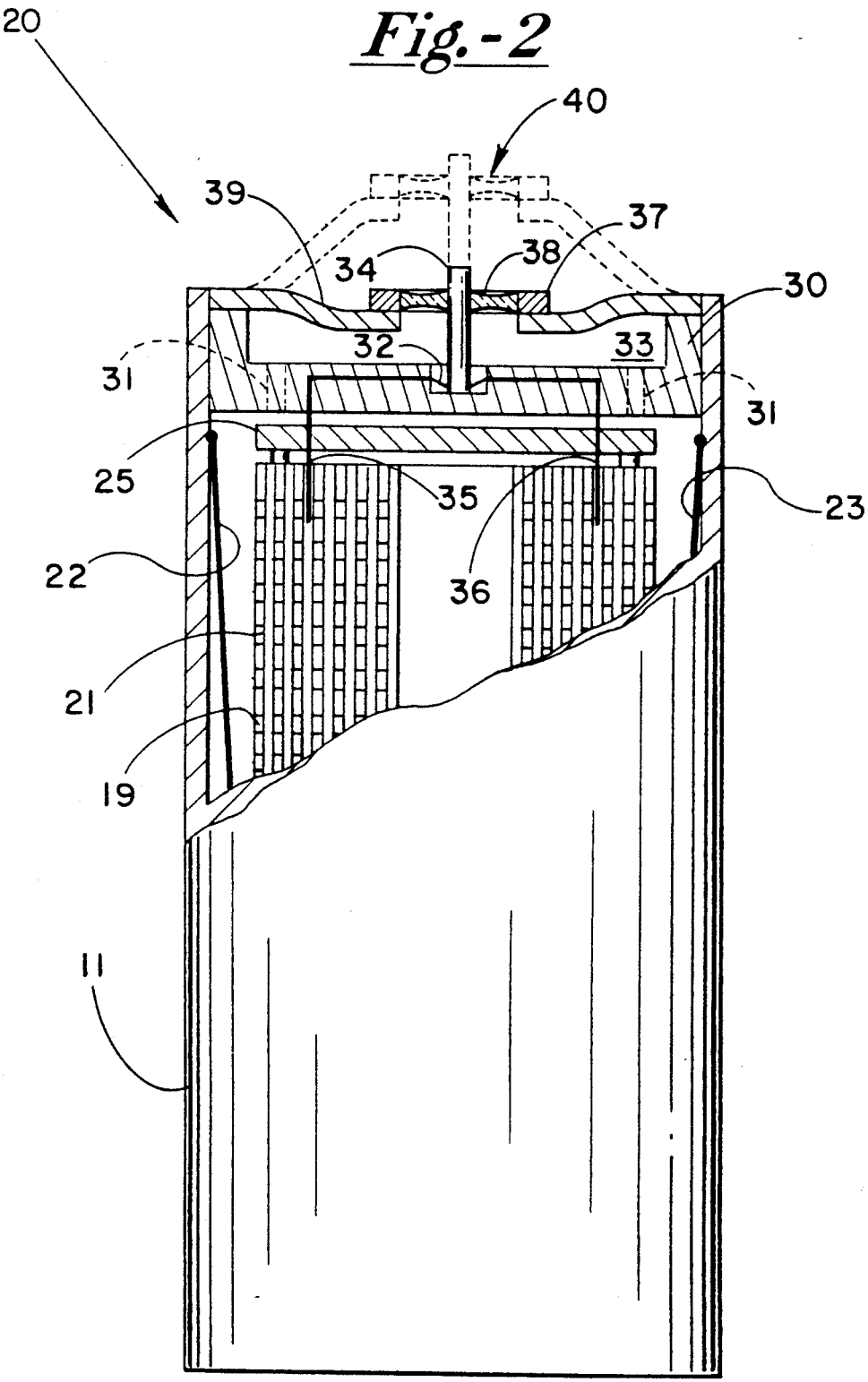
FIG. 2 is a view of a cell similar to that in FIG. 1 utilizing one embodiment of the invention.

FIG. 2 depicts a cell of the same size and internal electrochemical nature as the cell of FIG. 1 but provided with one embodiment of the present invention. The system of the invention includes an internal bulkhead 30 provided with internal bulkhead vents 31 into headspace 33. Spring contacts 32, or the like, are utilized to contact a terminal pin 34 with leads 35 and 36. The pin 34 makes contact by nestling in the spring 32 at one end and protrudes from the top of the cell through a metal housing 37 including a glass-to-metal seal 38. The reversible snap-action header is depicted at 39 in the normal or depressurized position in which contact is maintained between the pin 34 and the leads 35 and 36 in accordance with one embodiment of the invention. Shown in phantom at 40 is the alternate or overpressurized header position in which the terminal pin 34 is moved away from the spring connector 32 upon movement of the header, thereby breaking the connection between the terminal pin 34 and the leads 35 and 36. When the pressure is again lowered in the headspace 33, the reversible snap-action header will again return to the position depicted by the unbroken lines at sectional view at 39 reconnecting pin 34.

Figure 4:
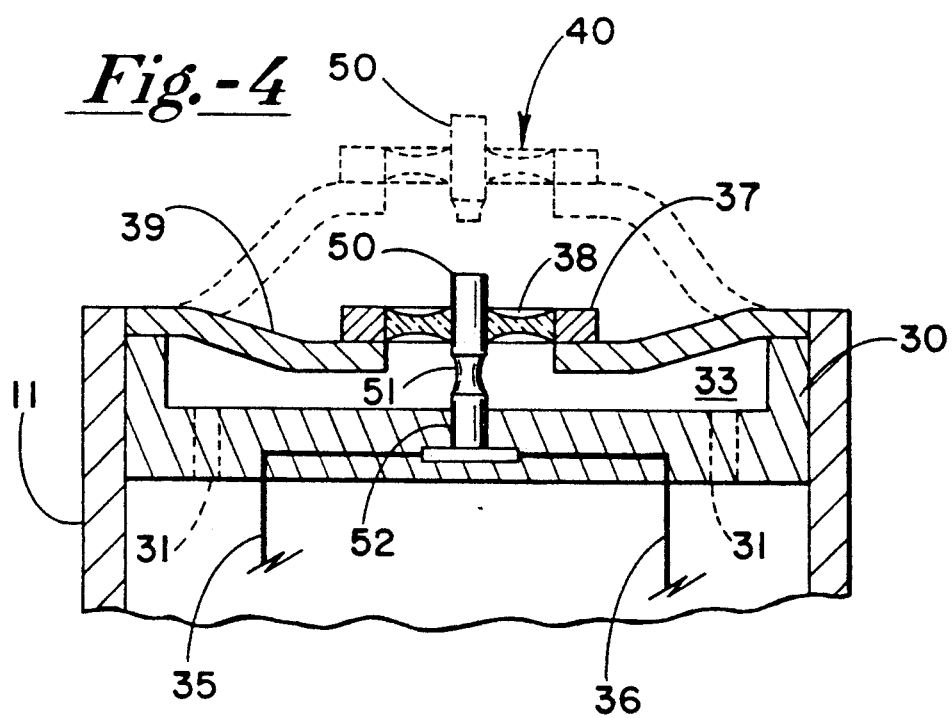

In the alternate embodiment of FIG. 4, the terminal pin 50 is provided with a necked down section 51 designed to produce tensile failure at a given pressure differential. The bottom of the terminal pin 50 at 52 is anchored into the header member 30 in a manner which makes the connection between the lower portion of the terminal pin 52 and the leads 35 and 36 permanent.

Figure 3:
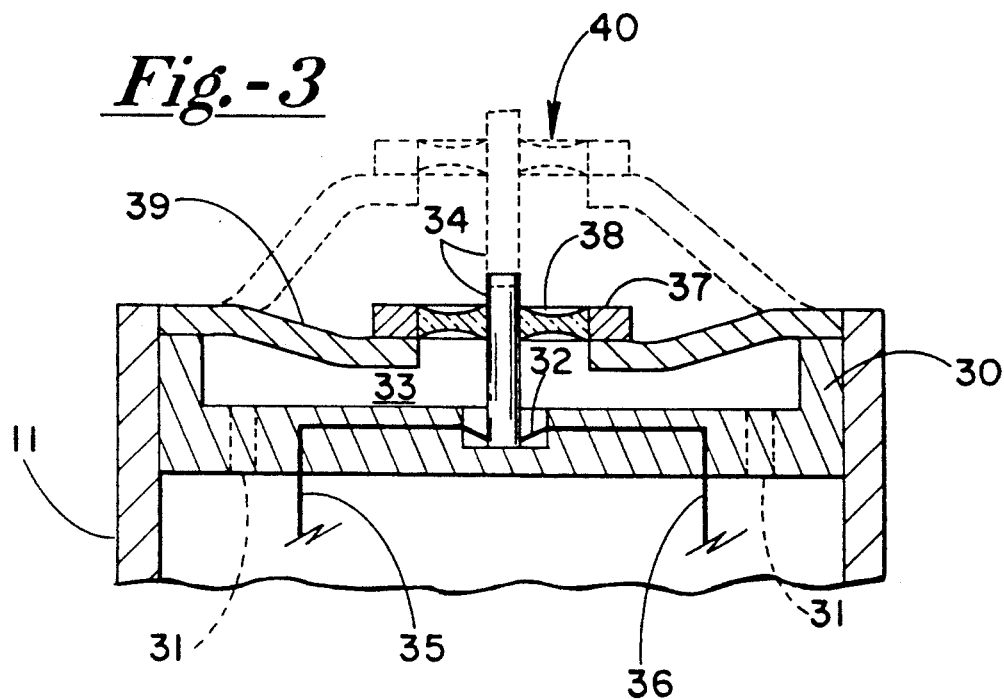
FIGS. 3 and 4 are sectional views depicting alternate embodiments of the snap-acting circuit breaking device of the invention.

In operation, during an over-pressure condition as might be caused by end-of-life cell life recharging failure or by overheating, or due to too rapid discharge of the cell, or the like, the internal pressure of the cell will rise, causing pressurized gas or fluid to escape from the inside of the cell through the internal bulk head vents as at 31. This, in turn, pressurizes the headspace designated 33 in FIGS. 2-4 until sufficient pressure differential exists to cause the snap-action header to suddenly snap into the position shown in the phantom in FIGS. 2-4. This breaks the circuit connection of the cell with respect to either the charging or discharging mode and thereby allows the internal cell pressure to eventually subside and, in the case of the examples of embodiment of FIGS. 2 and 3 where the elastic limit of the material is not exceeded, allows the header to be returned to its depressurized position, reestablishing the desired connection.

It should further be appreciated that the operation of the snap-action header diaphragm is dependent upon the proper shape and thickness of the header plate. Selection of proper material(s), forming technique, stress-relieving, etc. is readily available and known to those moderately skilled in the art. The configuration must simply allow for the internal pressure to produce an outward buckling force. Up to the desired pressure limit, the deformation of the diaphragm is minimal and within the elastic limits of the header material. Above the design pressure limit, a condition of elastic instability produces a sudden, pronounced, outward buckling of the diaphragm. This inversion of the diaphragm can, furthermore, be designed to be a permanent bulging of the header by insuring that the elastic limit of the header material is exceeded. Of course, by keeping the outward deformation within the elastic range of the material, the diaphragm will snap back into its original configuration once the internal pressure is removed. The header may also be of a back-to-back bimetallic construction and thereby operate by temperature and/or pressure effects.

The invention has been described herein in considerable detail in order to comply with the Patent Statutes and to provide those skilled in the art with the information needed to apply the novel principles and to construct and use such specialized components as are required. However, it is to be understood that the invention can be carried out using specifically different materials, equipment and devices and that various modifications can be accomplished without departing from the scope of the invention itself.

What is claimed is:

1. In an active metal, non-aqueous electrochemical cell having electrodes including a lithium anode, an organic electrolyte system and a cathode contained in a cell housing, at least one compression or hermetically sealed pin terminal connected to a cell electrode lead and extending through a cell header, the improvement comprising:

an hermetically sealed, pressure actuated, snap-action header diaphragm disconnect mechanism fixed to the pin terminal, and which snaps outward to disconnect, the pin terminal from the cell electrode to which it is connected in response to the internal pressure reaching a predetermined amount to operate the snap-action mechanism and wherein the position of the snap-action header diaphragm is visible from outside of the cell.

2. The apparatus of claim 1 wherein the pin terminal is reconnectable upon sufficient reduction of internal cell pressure and wherein the header diaphragm snaps back to its original position when the internal pressure is sufficiently reduced.

3. The apparatus of claim 1 wherein the elastic limit of the header diaphragm is exceeded by the predetermined amount of pressure causing a permanent outward deformation of the header membrane, thereby permanently disconnecting the lead.

4. The apparatus of claim 1 wherein the snap-action mechanism operates to sever the pin of the pin terminal lead connection permanently.

5. The apparatus of claim 1 wherein the electrolyte is ester-based.

6. An active metal, non-aqueous bipolar electrochemical cell having electrodes including a lithium anode, and a cathode, and an organic electrolyte system, contained in a cell housing, an hermetically sealed pin terminal lead connected to the anode or the cathode and extending through a cell header, an hermetically sealed, pressure actuated, snap-action header diaphragm disconnect mechanism fixed to, and disposed to snap outward to disconnect, the pin terminal from the electrode to which it is connected in response to elevated internal pressure reaching a sufficient amount to operate the snap-action mechanism, the position of the snap-action header diaphragm being visible from outside of the cell.

7. The electrochemical cell of claim 6 wherein the snap-action is irreversible.

8. The electrochemical cell of claim 7 wherein the snap-action reversibly reconnects the pin terminal and restores operable integrity to the cell.

9. The electrochemical cell of claim 6 wherein the snap-action permanently severs the pin terminal lead.

10. An active metal, non-aqueous bipolar electrochemical cell having a pair of electrodes including a lithium anode and a cathode, and an organic electrolyte system contained in a cell housing, an hermetically sealed pin terminal lead connected to the anode or the cathode and extending through a cell header, an hermetically sealed, pressure actuated, bimetallic snap-action header diaphragm disconnect mechanism fixed to, and disposed to snap outward to disconnect, the pin-type lead from the connected internal cell lead in response to elevated internal pressure reaching a sufficient amount to operate the snap-action mechanism, the position of the snap-action header diaphragm being visible outside of the cell.

11. The electrochemical cell of claim 10 wherein the snap-action is irreversible.

12. The electrochemical cell of claim 10 wherein the snap-action reversibly reconnects the pin terminal and restores operable integrity to the cell.

13. The electrochemical cell of claim 10 wherein the snap-action permanently severs the pin terminal lead.

* * * * *